(12) United States Patent
Iwaki et al.

(10) Patent No.: US 9,093,074 B2
(45) Date of Patent: Jul. 28, 2015

(54) IMAGE PROCESSING APPARATUS, IMAGE PROCESSING PROGRAM AND IMAGE PROCESSING METHOD

(75) Inventors: Mitsuzo Iwaki, Osaka (JP); Kenichi Takahashi, Sennan-gun (JP); Takeshi Minami, Amagasaki (JP); Daisuke Sakiyama, Kawanishi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 823 days.

(21) Appl. No.: 12/544,295

(22) Filed: Aug. 20, 2009

(65) Prior Publication Data

US 2010/0057458 A1 Mar. 4, 2010

(30) Foreign Application Priority Data

Aug. 27, 2008 (JP) ................................. 2008-217952

(51) Int. Cl.
*G10L 15/00* (2013.01)
*G10L 15/26* (2006.01)

(52) U.S. Cl.
CPC ...................... *G10L 15/26* (2013.01)

(58) Field of Classification Search
CPC ......... G10L 15/00; G10L 15/04; G10L 15/26; G10L 15/265
USPC ............... 704/235, 231, 251, 270, 270.1, 275
See application file for complete search history.

(56) References Cited

U.S. PATENT DOCUMENTS

| | | | |
|---|---|---|---|
| 6,463,430 B1 * | 10/2002 | Brady et al. ........................... 1/1 |
| 7,058,889 B2 * | 6/2006 | Trovato et al. ................ 715/716 |
| 2002/0147592 A1 | 10/2002 | Wilmot et al. | |
| 2007/0011012 A1 * | 1/2007 | Yurick et al. ................... 704/277 |
| 2007/0112837 A1 * | 5/2007 | Houh et al. .................... 707/102 |
| 2007/0188823 A1 | 8/2007 | Koide | |
| 2007/0255565 A1 * | 11/2007 | Yu et al. ......................... 704/251 |
| 2008/0115080 A1 | 5/2008 | Matulic | |

FOREIGN PATENT DOCUMENTS

| | | |
|---|---|---|
| JP | 07-021202 | 1/1995 |
| JP | 2000-066783 | 3/2000 |
| JP | 2002-297177 | 10/2002 |
| JP | 2002-366552 | 12/2002 |
| JP | 2004-289456 A | 10/2004 |
| JP | 2006-229874 | 8/2006 |
| JP | 2007-193409 A | 8/2007 |
| JP | 2008-097232 | 4/2008 |
| JP | 2008-140377 | 6/2008 |

OTHER PUBLICATIONS

Notification of Reasons for Refusal issued in the corresponding Japanese Patent Application No. 2008-217952 dated May 25, 2010, and an English Translation thereof.

* cited by examiner

*Primary Examiner* — Qi Han

(74) *Attorney, Agent, or Firm* — Buchanan Ingersoll & Rooney PC

(57) ABSTRACT

Regarding audio data related to document data, an image processing apparatus pertaining to the present invention generates text data by using a speech recognition technology in advance, and determines delimiter positions in the text data and the audio data in correspondence. In a keyword search, if a keyword is detected in the text data, the image processing apparatus plays the audio data from a delimiter that is immediately before the keyword.

17 Claims, 10 Drawing Sheets

FIG. 6

```
<kugiri no=0>
<text>
konica minolta opens a new european distribution center for
its office equipment
</text>
<kugiri no=1>
<text>
konica minolta business solutions europe headquartered in
langenhagen germany the european sales subsidiary of konica
minolta business tachnologies will open a new distribution
center in emmerich germany by integrating its existing
distribution centers in germany and belgium
</text>
<kugiri no=2>
...
```

FIG. 7

| Number | Time |
|---|---|
| 0 | 0 |
| 1 | 00:00:08 |
| 2 | 00:09:08 |
| ... | ... |

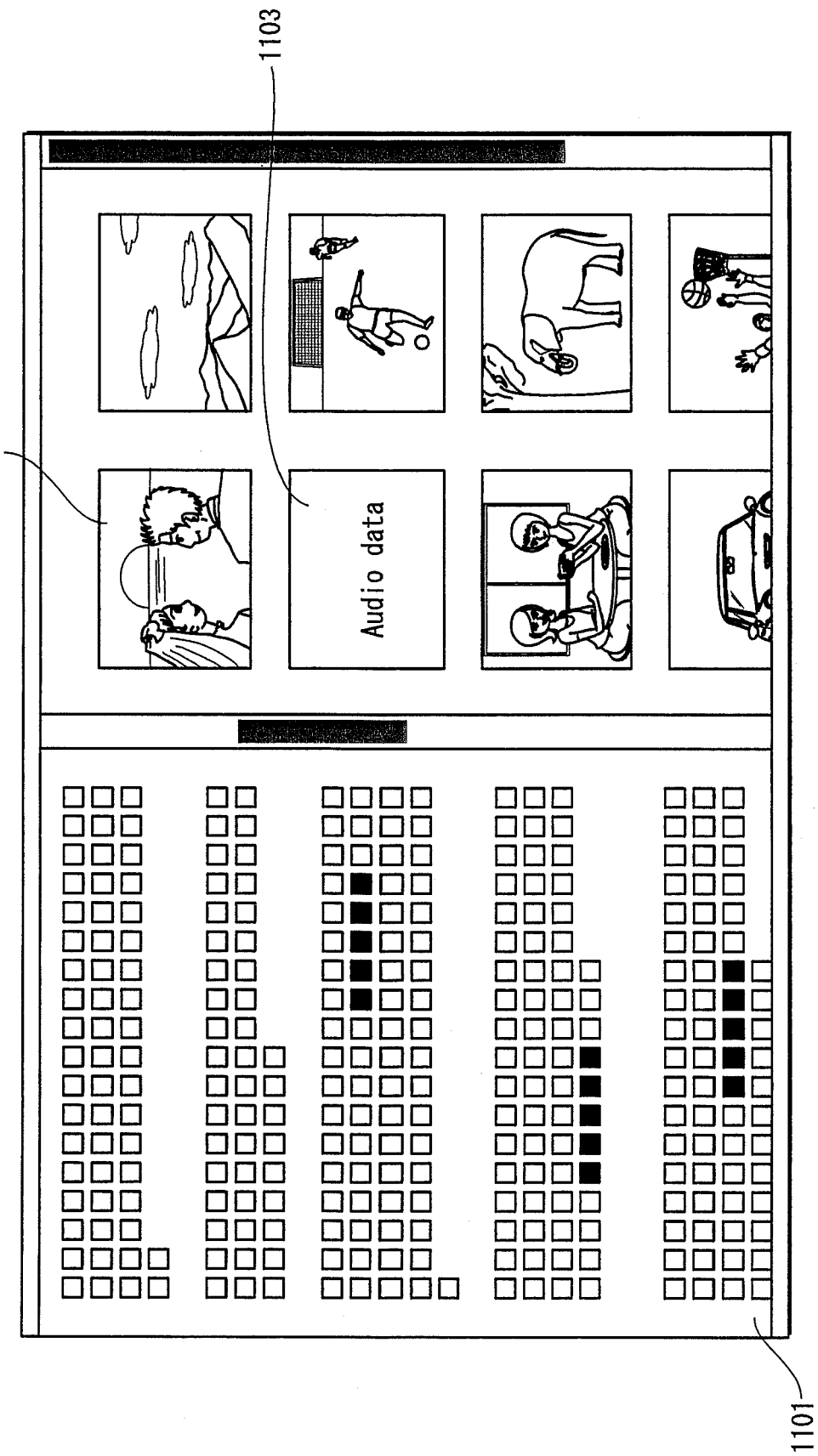

IMAGE PROCESSING APPARATUS, IMAGE PROCESSING PROGRAM AND IMAGE PROCESSING METHOD

CROSS-REFERENCE TO RELATED APPLICATION

This application is based on an application No. 2008-217952 filed in Japan, the contents of which is hereby incorporated by reference.

BACKGROUND OF THE INVENTION (1) Field of the Invention

The present invention relates to an image processing apparatus, an image processing program and an image processing method. In particular, the present invention relates to a technique to search by keywords for audio data whose location is indicated in document data.

(2) Description of the Related Art

In recent years, PDF (Portable Document Format) has been used as a common document format for electronic document interchange. There are various methods for creating PDF files. For example, it is possible to create a PDF file by using a scanner to scan a printed material.

In the case of using a scanner to create a PDF file, the contents of the document is converted to image data such as a bitmap. Thus, it is impossible to search the contents by keywords.

In view of this problem, a method for realizing the search by keywords using an OCR (Optical Character Reader) has been put to practical use. According to this method, an OCR generates document data based on the image, converts the document data to transparent texts, and overlay the transparent texts on the image.

Meanwhile, ceaseless efforts have been made to extend the specifications of PDF files. As a result of the efforts, it is now possible to embed audio data and movie data in a PDF file. Accordingly, keyword search for audio data and movie data is demanded to be realized as well.

To meet this demand, there is a technique to apply a speech recognition technology to, for example, audio data embedded in a PDF file and audio data included in movie data embedded in a PDF file, in order to extract keywords in advance. At the keyword search, if the search keyword matches any of the keywords extracted in advance, the user will be notified of that (see Japanese Laid-open Patent Application Publication No. 2004-289456, and Japanese Laid-open Patent Application Publication No. 2007-193409, for example).

According to this prior art technique, it is possible to judge whether the movie data or the like includes the keywords or not to some extent, by conducting the search. However, if the movie data is long, there is a problem that it takes a long time to find the portions in the movie data that include the keywords.

SUMMARY OF THE INVENTION

The present invention is made in view of the problem explained above, and aims to provide an image processing apparatus, an image processing program, and an image processing method that enables search for even the locations of a desired keyword in movie data, audio data, and so on.

To achieve the object above, one aspect of the present invention is an image processing apparatus comprising: an acquiring part operable to acquire document data; a text generator operable, if the document data indicates a location of audio data, to generate text data from the audio data by using a speech recognition technology; a delimiting part operable to determine positions of text delimiters that divide the text data into pieces so that the audio data is divided into pieces by audio delimiters that correspond with the text delimiters; and a storage operable to store therein the text data and the positions of the text delimiters, in association with the audio data.

It is preferable that the stated image processing apparatus further comprises: a receiver operable to receive a keyword; a searcher operable to search for the keyword through the text data associated with the audio data; a specifier operable to specify one of the text delimiters that is immediately before the keyword detected in the text data; and a player operable to play the audio data from one of the audio delimiters that corresponds to the specified one of the text delimiters.

With the stated structure, the delimiter positions in the audio data are determined in advance of the keyword search of the document data. Thus, when detecting the keyword from the audio data by the searching, the image processing apparatus can playback the audio data from the position near the keyword.

Further, if the audio data is accompanied with movie data, the player may play the movie data in synchronization with the audio data. With the stated structure, the image processing apparatus can playback the movie data as well, from the position near the keyword.

If this is the case, the image processing apparatus may further comprise: a displaying part operable to display the document data including a location of the movie data while the player is playing the movie data. With the stated structure, the image processing apparatus can display the document data as the target of the keyword search and the movie data from which the keyword has been detected on different screens or windows independently to provide better viewing of the search results.

Also, the delimiting part may determine the positions of the text delimiters such that the audio data is divided at time points from each of which a speech included in the audio data resumes after a pause that is longer than a predetermined time length. With the stated structure, the image processing apparatus does not play back the audio data from where no speech exists. Thus, it is possible to quickly play back the part including the keyword.

Also, in the case a speech included in the audio data continues from a time point of one of the audio delimiters for longer than a predetermined time length, the delimiting part may determine the positions of the text delimiters such that the audio data is divided at, as a time point of the next audio delimiter, a time point that is the predetermined time length after the time point of the one of the audio delimiters. With the stated structure, even if the speech continues for a long time, the image processing apparatus can skip the part not including the keyword, and quickly play back the keyword.

Here, note that the term "speech" means part or all of audio data that can be converted to text data with a speech recognition technology. It does not matter whether the speech is conversation or singing, uttered by a human or by other than a human such as a machine, etc.

The image processing apparatus may further comprise: a displaying part operable to display the document data; a document data searcher operable, if the document data indicates a location of other document data, to search for the keyword through said other document data; and a keyword displaying part operable to display a portion of said other document data from which the keyword has been detected.

With the stated structure, in the case the document data indicates a location (e.g. URL (Uniform Resource Locator))

of other document data, the image processing apparatus also handles said other document data as the keyword search target. If the keyword is detected from said other document data, the information processing apparatus displays the part where the keyword is detected to provide better viewing of the search results.

Further, the acquiring part may acquire the document data by scanning a document.

Another aspect of the present invention is an image processing program that causes a computer to perform: an acquiring step of acquiring document data; a text generating step of, if the document data indicates a location of audio data, generating text data from the audio data by using a speech recognition technology; a delimiting step of determining positions of text delimiters that divide the text data into pieces so that the audio data is divided into pieces by audio delimiters that correspond with the text delimiters; and a storage step of storing the text data and the positions of the text delimiters, in association with the audio data.

Another aspect of the present invention is an image processing method for execution by an image processing apparatus, the image processing method comprising: an acquiring step of acquiring document data; a text generating step of, if the document data indicates a location of audio data, generating text data from the audio data by using a speech recognition technology; a delimiting step of determining positions of text delimiters that divide the text data into pieces so that the audio data is divided into pieces by audio delimiters that correspond with the text delimiters; and a storage step of storing the text data and the positions of the text delimiters, in association with the audio data.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows an example of a preliminary file;

FIG. 7 is a table showing correspondence between delimiter numbers and delimiter positions in audio data;

FIG. 11 shows an example of a search screen pertaining to a modification example (6) of the present invention.

DESCRIPTION OF THE PREFERRED EMBODIMENT

The following explains embodiments of the image processing apparatus, the image processing program and the image processing method pertaining to the present invention, with reference to the drawings. In the following, a document search system is explained as an example.

[1] The Structure of the Document Search System

Firstly, the following explains the structure of the document search system pertaining to the present embodiment.

Figure 1:
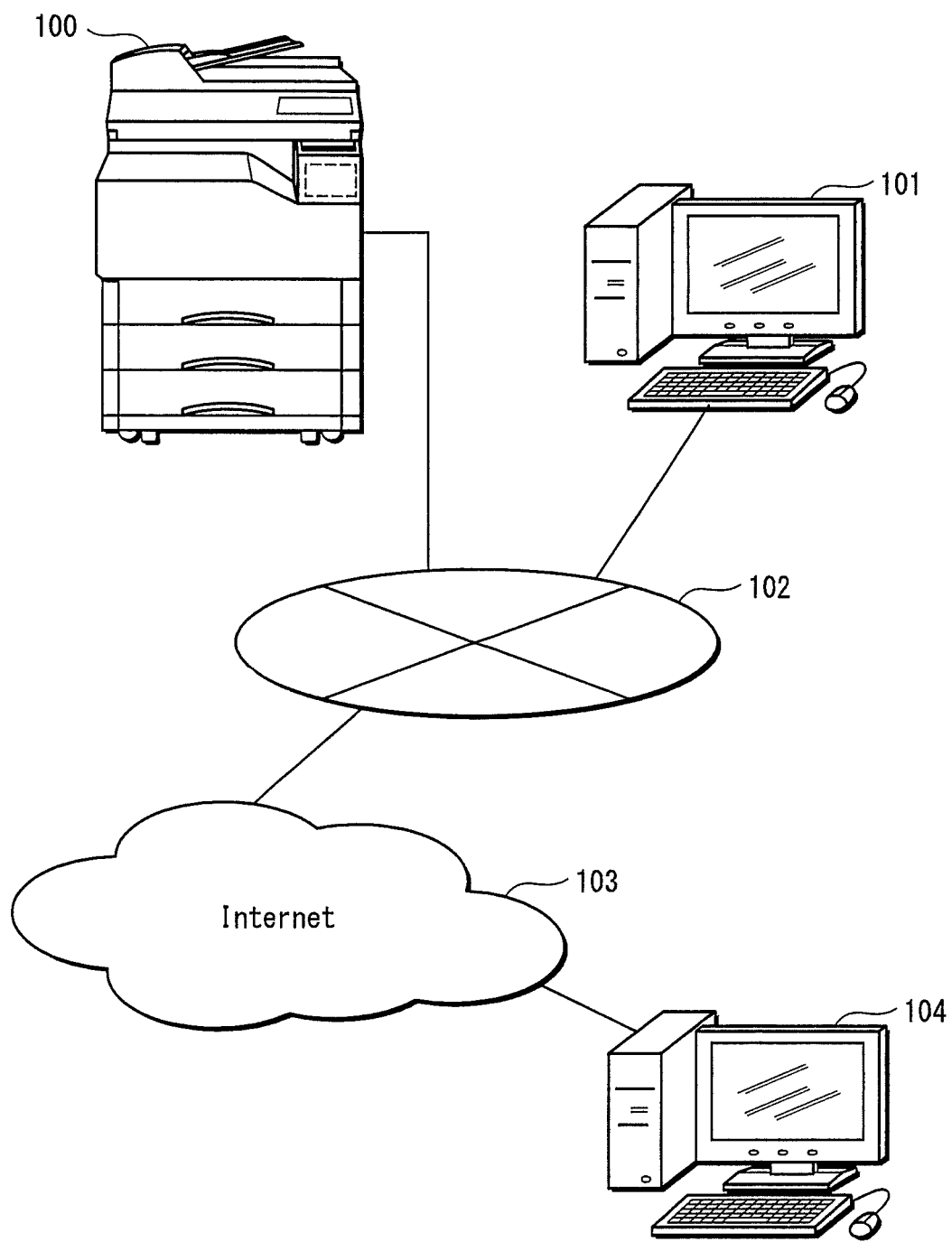
FIG. 1 shows a main structure of a document search system pertaining to an embodiment of the present invention.

FIG. 1 shows the main structure of the document search system pertaining to the embodiment. As FIG. 1 shows, a document search system 1 includes an MFP (Multi Functional Peripheral) 100 and a personal computer 101, which are connected with each other via a LAN (Local Area Network) 102. The LAN 102 is connected to Internet 103.

The MFP 100 scans a document by a scanner, and acquires movie data, audio data and so on from a WWW (World Wide Web) server 104, via the LAN 102 and the Internet 103.

In the following explanation, independent audio data and audio data included in movie data are collectively referred to as audio data.

[2] The Hardware Structure of the MFP 100

Next, the hardware structure of the MFP 100 is explained.

Figure 2:
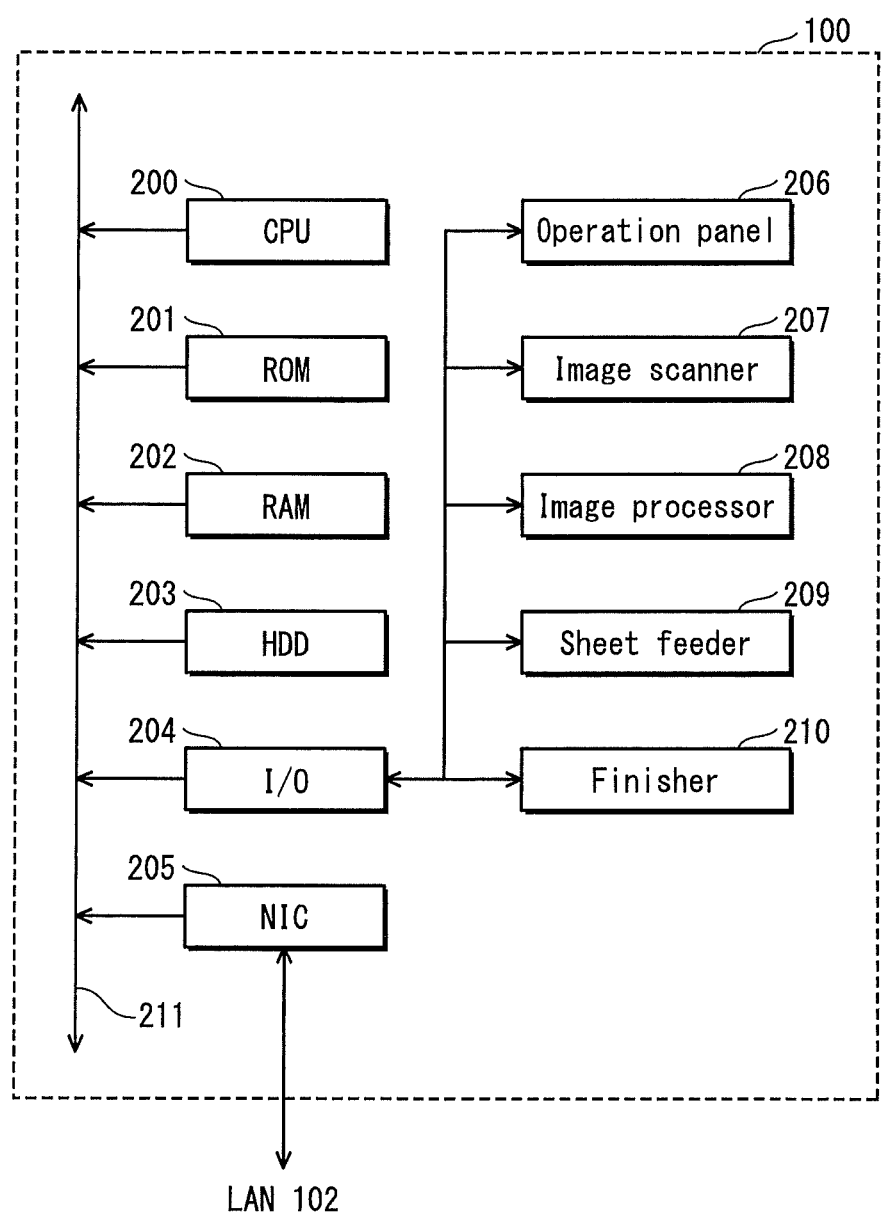
FIG. 2 shows a main hardware structure of an MFP 100.

FIG. 2 shows the main hardware structure of the MFP 100. As FIG. 2 shows, the MFP 100 includes a CPU (Central Processing Unit) 200, a ROM (Read Only Memory) 201, a RAM (Random Access Memory) 202, an HDD (Hard Disk Drive) 203, an input/output interface 204, and a NIC (Network Interface Card) 205, which are connected with an internal bus 211.

The CPU 200 is started up when the power is turned on, according to a program stored in the ROM 201. The CPU 200 operates using the RAM 202 as a work area. The HDD 203 stores therein document data, movie data, audio data and so on, which will be the targets of the keyword search.

The input/output interface 204 is connected with an operation panel 206, an image scanner 207, an image processor 208, a sheet feeder 209, and a finisher 210, and is used for data input/output with them. The NIC 205 is used for, for example, acquiring movie data and audio data from the WWW server 104 via the LAN 102 and the Internet 103.

The operation panel 206 displays document data that the user searches, and receives keywords input by the user, for example. The image scanner 207 scans the document and generates image data.

The image processor 208 forms images on a recording sheet provided by the sheet feeder 209, and ejects the sheet to the finisher 210, under control of the CPU 200.

[3] Operations of the MFP 100

Next, the operations performed by the MFP 100 are explained.

The following explains the operations performed by the MFP 100 in relation to keyword search of audio data.

(1) Main Routine

Figure 3:
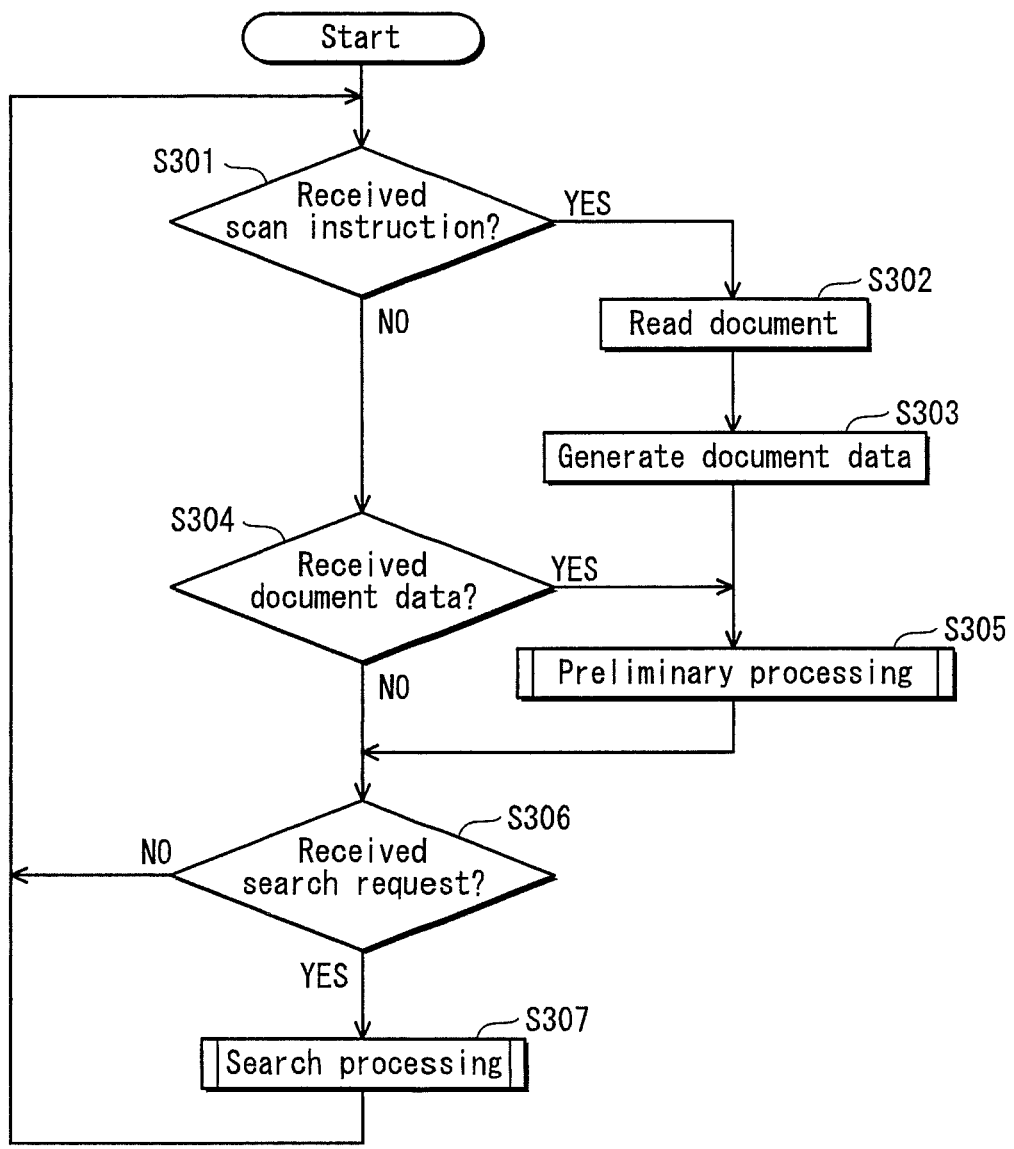
FIG. 3 is a flowchart showing a main routine of processing that the MFP 100 executes in relation to keyword search of movie data and audio data.

FIG. 3 is a flowchart showing a main routine of the processing that the MFP 100 executes in relation to keyword search of audio data.

As FIG. 3 shows, on receipt of an instruction to scan the document from the user via the operation panel 206 (S301: YES), the MFP 100 scans each sheet of the document by using the image scanner 207 to generate image data (S302). After that, the MFP 100 generates document data from the image data by using a character recognition technology (S303), and then performs preliminary processing (S305).

As described later, the preliminary processing is performed for making the audio data searchable. Also in the case of receiving document data from another apparatus such as the personal computer 101 (S304: YES), the MFP 100 performs the preliminary processing (S305).

In the case of receiving a search request from the user via the operation panel 206, or receiving a search request from another apparatus (S306:YES), the MFP 100 performs search processing (S307). The search processing is also explained later in detail.

(2) Preliminary Processing

The following explains the preliminary processing (S305).

Figure 4:
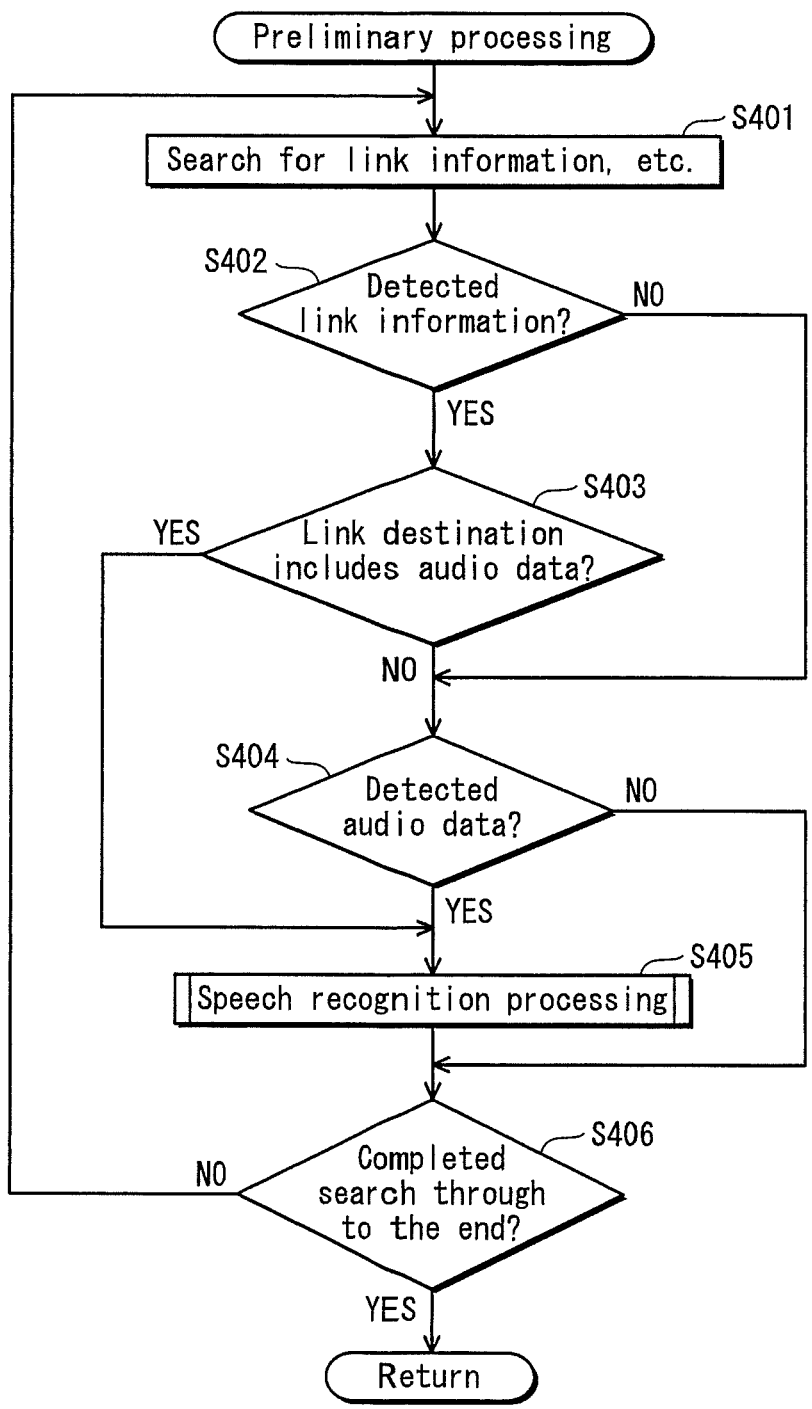
FIG. 4 is a flowchart showing preliminary processing procedures.

FIG. 4 is a flowchart showing preliminary processing procedures. As FIG. 4 shows, the MFP 100 firstly performs, as the preliminary processing, searching of the document data, in order to check whether the document data includes link information and audio data (S401). Here, link information is information used for acquisition of data not included in the document data. For example, a URL is link information.

In the case of detecting link information (S402:YES), if the link destination includes audio data (S403: YES), the MFP 100 performs speech recognition processing (S405).

Also, in the case of detecting audio data in the document data (S404: YES), the MFP 100 performs speech recognition processing (S405).

Then, after carrying out the search of the document data through to the end (S406: YES), the MFP 100 returns to the main routine. Otherwise, the MFP 100 moves to the Step S401, and continues the searching.

(3) Speech Recognition Processing

Next, the speech recognition processing (S405) is explained.

Figure 5:
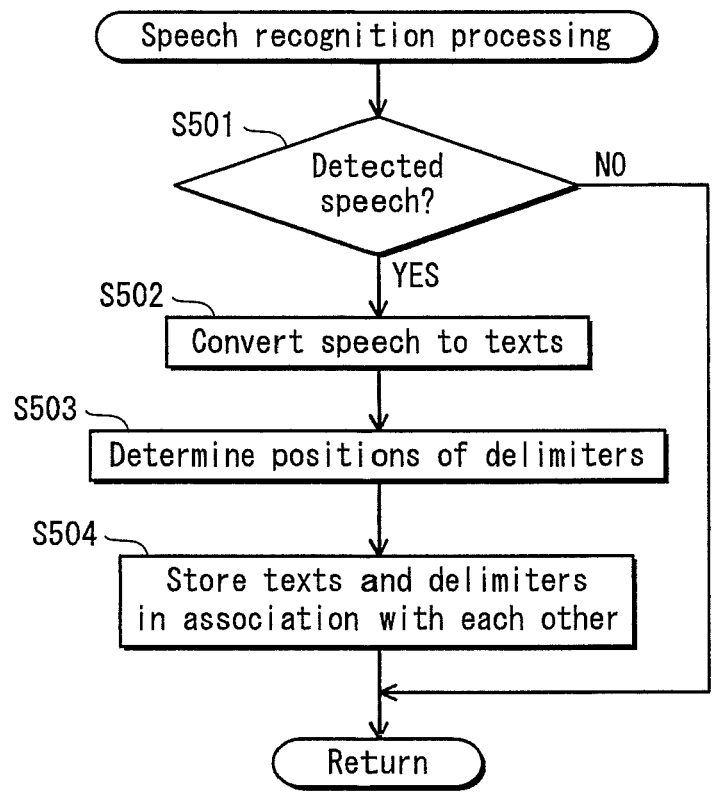
FIG. 5 is a flowchart showing processing procedures for speech recognition.

FIG. 5 is a flowchart showing processing procedures for the speech recognition. As FIG. 5 shows, if the MFP 100 detects a speech from the detected audio data with a speech recognition technology (S501: YES), the MFP 100 converts the speech to texts with the speech recognition technology (S502).

If the MFP 100 does not detect any speech with the speech recognition technology (S501: NO) (e.g. in the case the audio data is instrumental music data), the MFP 100 finishes the processing without performing the conversion.

Next, the MFP 100 determines the positions of delimiters in the audio data (S503). In this embodiment, if no speech is detected from the audio data for five or more seconds, the start position of the next speech is determined as a delimiter. In the case a speech continues for one or more minutes, a delimiter is placed to have a one-minute interval from the previous delimiter.

Alternatively, it is possible to allow the user to determine the delimiter positions.

As described later, if the MFP 100 detects the keyword from the texts, the playback of the audio data is started from the delimiter that positions immediately before the keyword.

Next, the MFP 100 stores the texts and the delimiters in the HDD 203 in association with each other (S504). In the following explanations, a file composed of the texts and the delimiters in association is called "preliminary file".

FIG. 6 shows an example of a preliminary file. As FIG. 6 shows, each text is recorded between a pair of text tags. At the position of each delimiter, a kugiri (i.e. delimiter) tag and its number (hereinafter called "delimiter number") is recorded.

FIG. 7 is a table (hereinafter called "delimiter time table") showing correspondence between the delimiter numbers and the delimiter positions (hereinafter called "delimiter times"). As FIG. 7 shows, the delimiter numbers and the delimiter times are stored in the HDD 203 in one-to-one association.

(4) Search Processing

The following explains the search processing (S307).

Figure 8:
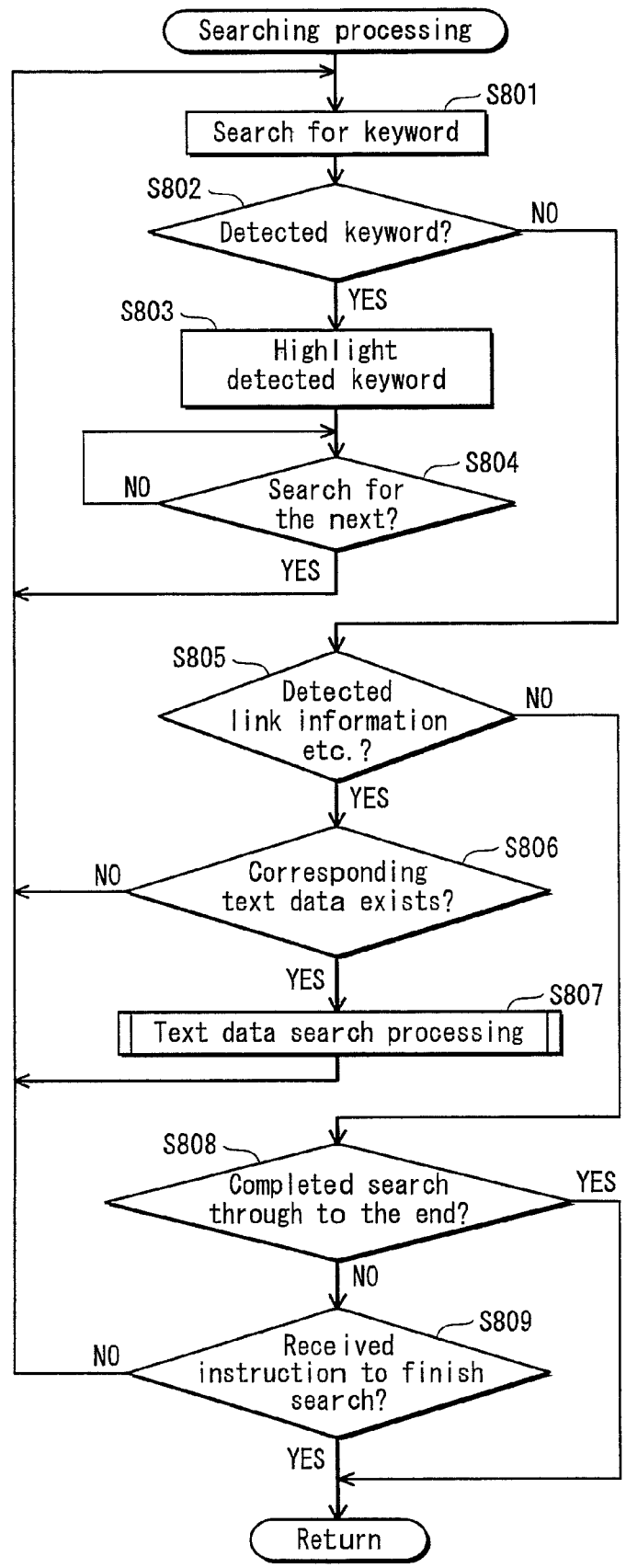
FIG. 8 is a flowchart showing processing procedures for searching.

FIG. 8 is a flowchart showing processing procedures for the searching. As FIG. 8 shows, the MFP 100 searches for the keyword from the beginning of the document data as the search target (S801). If the keyword is detected (S802: YES), the MFP 100 highlights the detected keyword, together with the part including the keyword (S803).

The MFP 100 keeps the highlighting until receiving an instruction to search the next from the user via the operation panel 206 (S804: NO). On receipt of an instruction to search the next (S804: YES), the MFP 100 moves to Step S801 and continues the keyword search.

If link information or audio data is detected (S805: YES), the MFP 100 checks whether there is corresponding text data. If there is such text data (S806:YES), the MFP 100 performs text data search processing for checking whether the text data includes the keyword (S807). If there is no corresponding text data (S805: NO), or if the text data search has been completed (S807), the MFP 100 continues the keyword search (S801).

After carrying out the search of the document data through to the end (S808: YES), the MFP 100 finishes the searching and returns to the upper-level routine.

Even if the search of the document data has not been completed (S808: NO), the MFP 100 returns to the upper-level routine on receipt of an instruction to finish the search from the user via the operation panel 206 (S809: YES). Otherwise, the MFP 100 continues the keyword search (S801).

(5) Text Data Search Processing

The following explains the text data search processing (S807).

Figure 9:
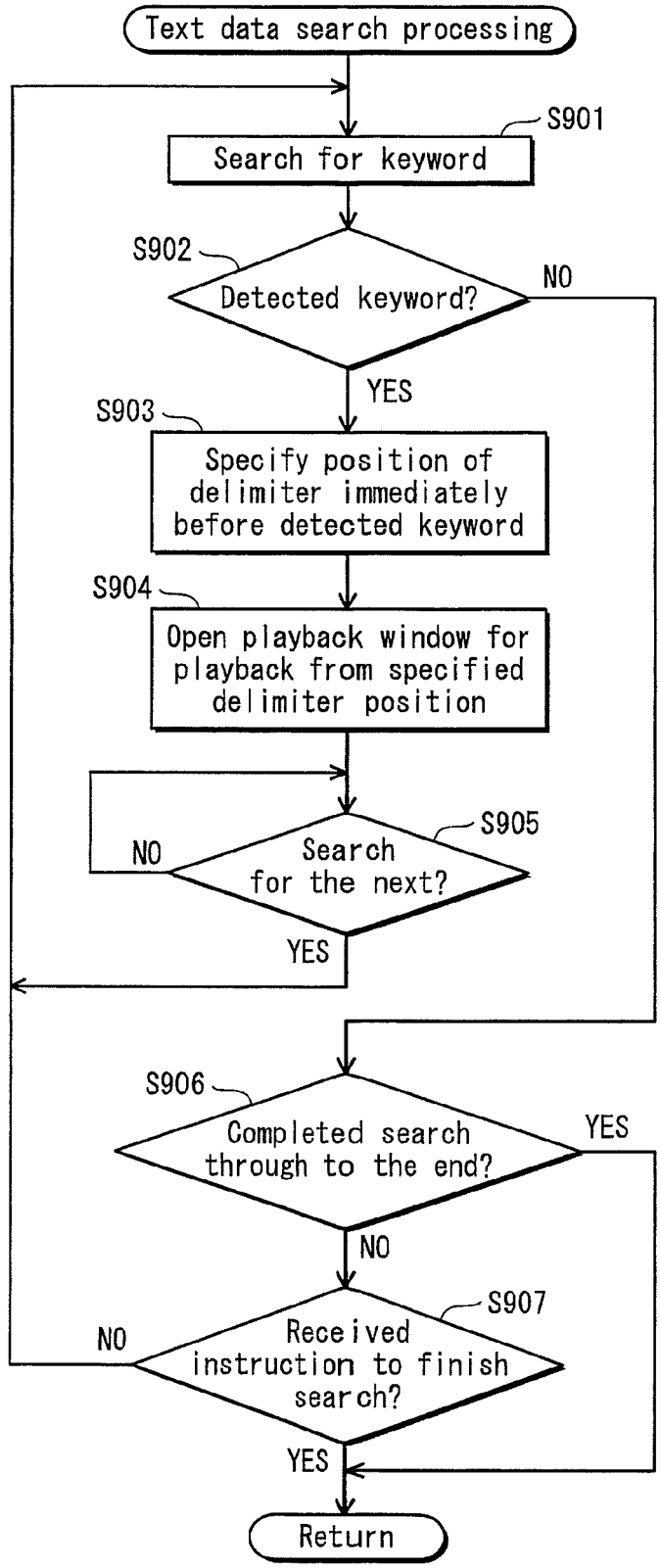
FIG. 9 is a flowchart showing processing procedures for text data searching.

FIG. 9 is a flowchart showing processing procedures for the text data search. As FIG. 9 shows, the MFP 100 searches for the keyword from the beginning of the preliminary file corresponding to the detected link information or the like (S901). If the keyword is detected (S902: YES), the MFP 100 specifies the delimiter position that is immediately before the detected keyword (S903).

By specifying the delimiter position, it is possible to specify the delimiter number. Further, it is possible to specify the delimiter time corresponding to the delimiter number, with reference to the delimiter time table.

Figure 10A:
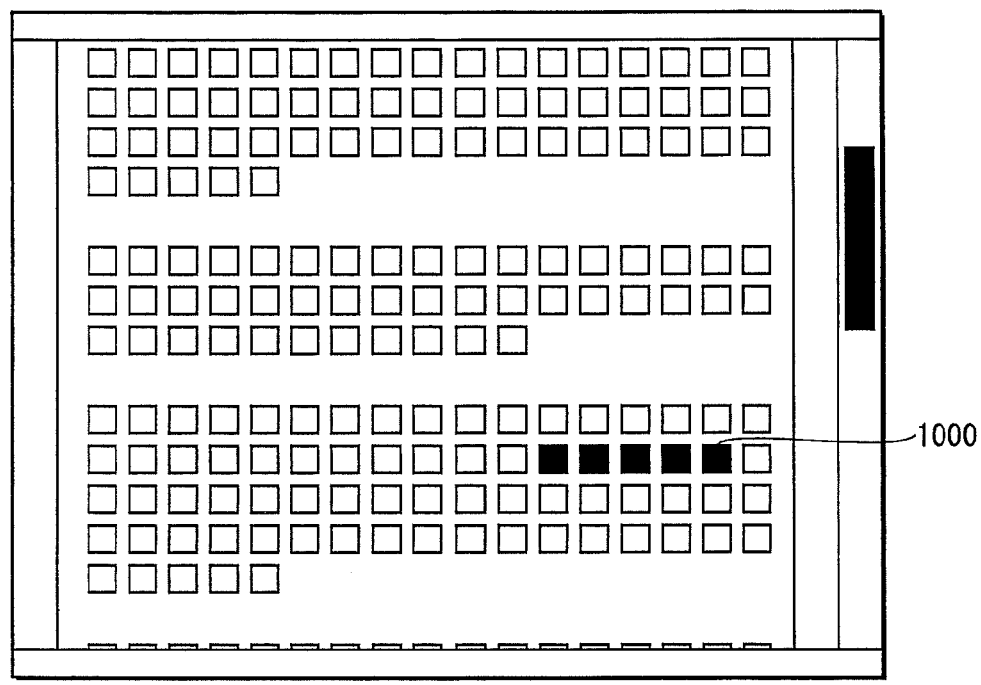
FIG. 10A and FIG. 10B show examples of a keyword search window and a playback window respectively.
Figure 10B:
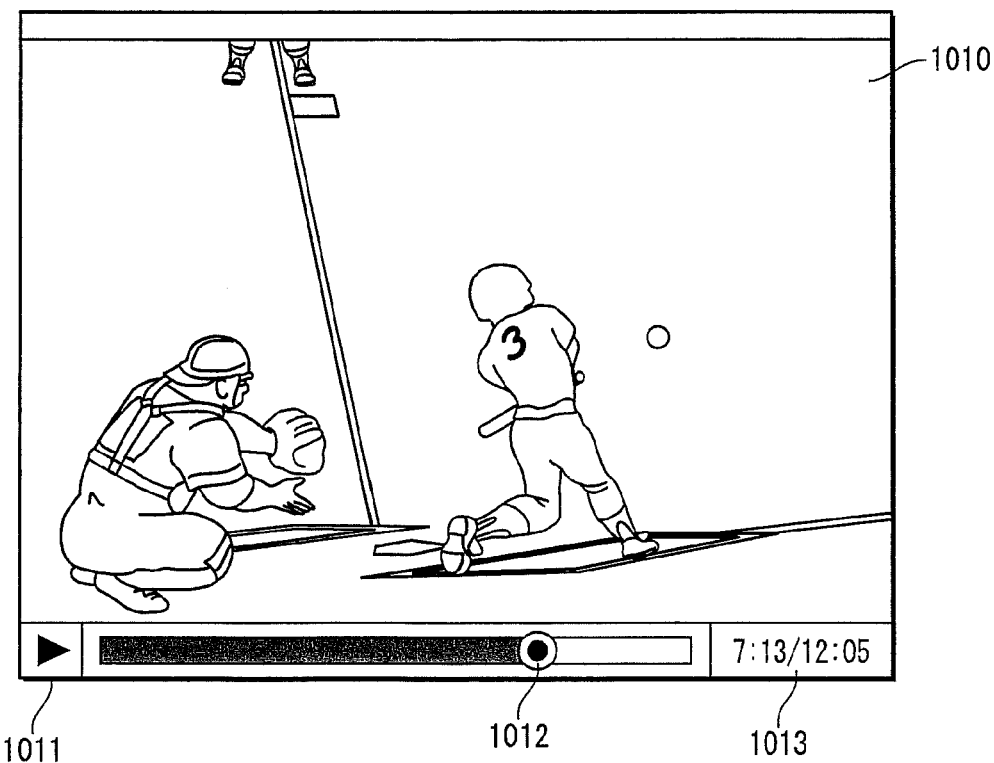

The MFP 100 opens windows on the operation panel 206, in order to play the audio data corresponding to the text data (or movie data in the case the audio data is included in movie data). FIG. 10A and FIG. 10B show examples of a keyword search window and a playback window, respectively. In FIG. 10, a keyword search window 10a and a playback window 10b are displayed together.

The keyword search window 10a is a window for displaying document data as the target of the keyword search. In this example, the detected keyword (i.e. link information) 1000 is highlighted. The playback window 10b shows a thumbnail 1010 of a movie that corresponds to the keyword 1000. The total duration of this video data is 12 minutes 5 seconds, and the thumbnail 1010 shows the frame at the delimiter position whose delimiter time is 7 minutes 13 seconds.

On clicking of a playback button 1011, the movie is played back from the delimiter time. The position button 1012 moves from left to right according to the progression of the playback of the audio data or the movie data, and reaches the right endpoint when the playback is completed. A time display box 1013 shows the time of the current playback position and the total time of the data.

On receipt of an instruction to search for the next from the user via the operation panel 206 (S905: YES), the MFP 100 continues the search (S901).

After carrying out the search of the preliminary file through to the end (S906: YES), the MFP 100 finishes the processing, and returns to the upper-level routine. Even if the search of the preliminary file has not been completed (S906: NO), the MFP 100 finishes the processing and returns to the upper-level routine on receipt of an instruction to finish the search from the user via the operation panel 206 (S907: YES). Otherwise, the MFP 100 continues the keyword search (S901).

[4] Modification Examples

The present invention is described above based on the embodiment. However, as a matter of course, the present invention is not limited to the embodiment. The following are possible modifications.

(1) Although not particularly explained above, the generation of the document data from the image data, which is performed in Step S303 above, can be realized with use of any well-known character recognition technology used in an OCR (Optical Character Reader) or the like. No matter what character recognition technology is used for the generation of the document data, the advantageous effects of the present invention can be achieved.

(2) Although not particularly explained above, the conversion from speeches included in audio data to texts, which is performed in Step S502 above, can be realized with use of any well-known speech recognition technology. No matter what speech recognition technology is used for the conversion from the speeches to the texts, the advantageous effects of the present invention can be achieved.

(3) The embodiment above explains the case of converting audio data to texts to enable the search of the audio data. However, as a matter of course, the present invention is not limited to this. Alternatively, or additionally, the following may be adopted.

In the case the document data includes movie data, or in the case the link destination is movie data, it is possible to convert the movie data to texts by using a character recognition technology, and record the texts in association with delimiter positions.

As a result, the texts included in the movie data can be handled as the target of the keyword search, in the same manner as in the case of the audio data. Further, if a keyword is detected, it is possible to provide more convenience to the user by playing back the movie data from the delimiter position.

(4) Although not particularly explained above, in the case of MPEG-2 (ISO/IEC 1318: Generic coding of moving pictures and associated audio information), it is possible to specify the delimiter position according to the value of PTS (Present Time Stamp), which is included in the header of the PES (Packetized Elementary Stream) constituting the transport stream.

Besides, in order to specify the delimiter position, it is preferable to use an appropriate value according to the data structure of movie data and audio data. It should be noted here that no matter what method is used for specifying the delimiter position, the advantageous effects of the present invention can be achieved.

(5) The embodiment above explains the case where the start position of the next speech is determined as a delimiter if no speech is detected from the audio data for five or more seconds, and in the case a speech continues for one or more minutes, a delimiter is placed to have a one-minute interval from the previous delimiter.

However, as a matter of course, the present invention is not limited to this. It is possible to more quickly play back the part of the audio data where the keyword is included by determining the delimiter positions such that the text data is divided in the middle into plural pieces.

For example, assume the case where the delimiter is placed in the center of the text data. In this case, if the keyword is found in the last half of the text data, the part of the audio data that corresponds to the last half will be played back. As a result, it is possible to more quickly play back the part including the keyword. Thus, it is possible to further quickly play back the part of the audio data where the keyword is included by determining the delimiter positions such that the text data is divided into smaller pieces.

(6) The embodiment above explains the case of sequentially searching the document data or the like from the beginning of the data. However, as a matter of course, the present invention is not limited to this. Alternatively, the following may be adopted.

Firstly, the search may be conducted throughout the document, and all the keywords detected from the document may be highlighted. If the movie data or the audio data includes the keyword, the keyword may be displayed such that the user can play back the movie data or the like from the delimiter that positions immediately before the keyword.

FIG. 11 shows an example of the search screen pertaining to this modification example. As FIG. 11 shows, the document data as the target of the keyword search is displayed on the left side of a window 11, and detected keywords are highlighted. Also, the right side of the window 11 shows thumbnails that allow the user to play back all the videos and audios from the delimiters that are positioned immediately before the detected keywords.

For example, in the case of a movie, a thumbnail 1102 at the delimiter position is displayed. In the case of an audio, a message as the thumbnail 1103 shows is displayed to inform the user of that the data is audio data.

When the user clicks on the thumbnail 1102 and the thumbnail 1103, the movie and the audio are played back. Note that in the case of playback of a movie, the movie may be played back on the same window or on a newly opened window as FIG. 10 shows.

FIG. 11 shows the case where the window 11 can not display the whole document and all the thumbnails, and scroll bars for scrolling up and down the document and the thumbnails 1102 and 1103 are displayed. The user can see the hidden part by operating the scroll bars.

Instead of the scroll bars, page switch buttons may be provided, to switch pages to show different parts of the document and different thumbnails.

(7) The embodiment above explains the case of converting audio data to texts to enable the search of the audio data. However, as a matter of course, the present invention is not limited to this. Alternatively, or additionally, the following may be adopted.

For example, in the case where the keyword detected from the document data is a link indicating a WWW page, the WWW page may be considered as the target of the keyword search. If the keyword is detected from the WWW page, the WWW page will be displayed on another window and the detected keyword will be highlighted.

With such a structure, it is possible to conduct the keyword search of the document data and so on within a broader scope.

(8) The embodiment above explains the case where the movie data and so on from which the keyword has been detected is displayed on another window. However, as a matter of course, the present invention is not limited to this. Alternatively, the movie data may be displayed on the same window.

Also, although the embodiment above explains the case of highlighting the detected keywords, the present invention is not limited to this, as a matter of course. Alternatively, other methods may be adopted. For example, the detected keywords may be underlined, or the color of the keywords may be changed.

(9) Although not particularly explained above, in some cases, a plurality of pieces of document data include the same audio data, or include links indicating the same audio data.

Thus, the preliminary files and the delimiter time table, generated with use of the audio data, may be recorded in the HDD 203 in association with only the audio data, and the preliminary files and so on may be referred to in the keyword search of the audio data with respect to any of the pieces of documents.

With such a structure, it is unnecessary to record the same preliminary files and the same delimiter time tables redundantly. This saves the storage space of the HDD 203.

Also, it is possible to reduce the processing load on the MFP 100 by checking whether there are any preliminary files and so on that relate to the same audio data in advance of generation of the preliminary files and the delimiter time table. This is because such operations make it unnecessary to perform the speech recognition processing redundantly.

(10) Although not particularly explained above, the MFP 100 may generate the preliminary files, etc. on receipt of an instruction from the user via the operation panel 206, or on completion of the scanning of a document by the image scanner 207. Alternatively, the MFP 100 may perform the processing on receipt of document data from another apparatus.

Also, the MFP 100 may generate the preliminary files, etc. on receipt of a request for the keyword search from the user. If this is the case, once the MFP 100 generates the files, the MFP 100 can use the files in the next and later searches.

The advantageous effects of the present invention can be achieved regardless of when the preliminary files and so on are generated.

(11) The embodiment above explains the case where the MFP generates the preliminary files and so on. However, as a matter of course, the present invention is not limited to this. Other apparatus, such as a scanner and a personal computer, may generate them.

The embodiment above explains the case where the MFP conducts the keyword search. However, other apparatuses may conduct the keyword search by referring to the preliminary files and so on. Also, the apparatus that generates the preliminary files and the apparatus that conducts the keyword search by referring to the preliminary files and so on are not necessarily the same.

(12) Although not particularly explained above, the present invention may be realized as the program that is recorded on a computer-readable recording medium, such as a floppy disk, a hard-disk, a CD-ROM, a MO, a DVD-ROM, a DVD-RAM and a semiconductor memory.

Further, the present invention may be may be realized such that the computer program is transmitted across telecommunications networks, wired and wireless communication lines, networks such as the Internet, and so on.

Further, the computer program and the digital signal may be installed on an independent computer system by either recording the digital signal one of the recording medium and transferring the recording medium, or transferring the computer program and digital signal via one of the networks.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
an acquiring part operable to acquire document data;
a text generator operable, that, when the acquired document data includes audio data, generates text data from the audio data with speech recognition technology;
a delimiting part operable to create text delimiter markers that divide the text data into pieces corresponding to pieces of the audio data that is divided into pieces by audio delimiter markers, each audio delimiter marker specifying a starting position of a corresponding audio piece;
a file generator operable to generate a file in which the text data and the positions of the text delimiter markers are associated with the audio data;
a storage operable to store therein the file generated by the file generator;
a receiver operable to receive a keyword; and
a searcher operable to, when the acquired document data includes audio data, search for the keyword through the text data associated with the audio data,
wherein the delimiting part determines the positions of the text delimiter markers such that the audio data is divided at time points from each of which a speech included in the audio data resumes after a pause that is longer than a predetermined time length, and
wherein, when the acquiring part newly acquires other document data that is different from the acquired document data, and when the other document data includes the same audio data as the audio data included in the acquired document data, the searcher conducts a search with respect to the audio data included in said other document data of files previously stored in the storage.

2. The image processing apparatus of claim 1, further comprising:
a specifier operable to specify one of the text delimiter markers that is immediately before the keyword detected in the text data; and
a player operable to play the audio data from one of the audio delimiter markers that corresponds to the specified one of the text delimiter markers.

3. The image processing apparatus of claim 2, wherein if the audio data is accompanied with movie data, the player plays the movie data in synchronization with the audio data.

4. The image processing apparatus of claim 3, further comprising
a displaying part operable to display the document data including a location of the movie data while the player is playing the movie data.

5. The image processing apparatus of claim 1, further comprising:
a displaying part operable to display the document data;
a document data searcher operable, if the document data indicates a location of other document data, to search for the keyword through said other document data; and
a keyword displaying part operable to display a portion of said other document data from which the keyword has been detected.

6. The image processing apparatus of claim 1, wherein the acquiring part acquires the acquired document data by scanning a document.

7. The image processing apparatus of claim 1, wherein in case a speech included in the audio data continues from a time point of one of the audio delimiter markers for longer than a predetermined time length, the delimiting part divides the audio data with another audio delimiter marker at a time point that is the predetermined time length after the time point of the one of the audio delimiter markers.

8. An image processing apparatus comprising:
an acquiring part operable to acquire document data;
a text generator operable, that, when the acquired document data includes audio data, generates text data from the audio data with speech recognition technology;
a delimiting part operable to create text delimiter markers that divide the text data into pieces corresponding to pieces of the audio data that is divided into pieces by audio delimiter markers, each audio delimiter marker specifying a starting position of a corresponding audio piece;
a file generator operable to generate a file in which the text data and the positions of the text delimiter markers are associated with the audio data;
a storage operable to store therein the file generated by the file generator;
a receiver operable to receive a keyword; and
a searcher operable to, when the acquired document data includes audio data, search for the keyword through the text data associated with the audio data,
wherein in case a speech included in the audio data continues from a time point of one of the audio delimiter markers for longer than a predetermined time length, the delimiting part divides the audio data with another audio delimiter marker at a time point that is the predetermined time length after the time point of the one of the audio delimiter markers, and
wherein, when the acquiring part newly acquires other document data that is different from the acquired document data, and when the other document data includes the same audio data as the audio data included in the acquired document data, the searcher conducts a search with respect to the audio data included in said other document data of files previously stored in the storage.

9. An image processing method for execution by an image processing apparatus, the image processing method comprising:
an acquiring step of acquiring document data;
a text generating step of, when the acquired document data includes audio data, generating text data from the audio data with a speech recognition technology;
a delimiting step of creating text delimiter markers that divide the text data into pieces corresponding to pieces of the audio data that is divided into pieces by audio delimiter markers, each audio delimiter marker specifying a starting position of a corresponding audio piece;
a generating step of generating a file in which the text data and the positions of the text delimiter markers are associated with the audio data;
a storage step of storing the file generated by the file generator;
a receiving step of receiving a keyword; and
a searching step of, when the acquired document data includes audio data, searching for the keyword through the text data associated with the audio data,
wherein the delimiting step of determining the positions of the text delimiter markers such that the audio data is divided at time points from each of which a speech included in the audio data resumes after a pause that is longer than a predetermined time length, and
wherein, when the acquiring step newly acquires other document data that is different from the acquired document data, and when the other document data includes the same audio data as the audio data included in the acquired document data, the searching step conducts a search with respect to the audio data included in said other document data of files previously stored in the storage.

10. The image processing method of claim 9, further comprising:
a specifying step of specifying one of the text delimiter markers that is immediately before the keyword detected in the text data; and
a playing step of playing the audio data from one of the audio delimiter markers that corresponds to the specified one of the text delimiter markers.

11. The image processing method of claim 10, wherein if the audio data is accompanied with movie data, the movie data is played in the playing step in synchronization with the audio data.

12. The image processing method of claim 11, further comprising
a displaying step of displaying the document data including a location of the movie data while the movie data is being played in the playing step.

13. The image processing method of claim 9, further comprising:
a displaying step of displaying the document data;
a document data searching step of, if the document data indicates a location of other document data, searching for the keyword through said other document data; and
a keyword displaying step of displaying a portion of said other document data from which the keyword has been detected.

14. The image processing method of claim 9, wherein in case a speech included in the audio data continues from a time point of one of the audio delimiter markers for longer than a predetermined time length, the delimiting part divides the audio data with another audio delimiter marker at a time point that is the predetermined time length after the time point of the one of the audio delimiter markers.

15. A nontransitory computer readable medium encoded with an image processing program that causes a computer to perform the method of claim 9.

16. An image processing method for execution by an image processing apparatus, the image processing method comprising:
an acquiring step of acquiring document data;
a text generating step of, when the acquired document data includes audio data, generating text data from the audio data with a speech recognition technology;
a delimiting step of creating text delimiter markers that divide the text data into pieces corresponding to pieces of the audio data that is divided into pieces by audio delimiter markers, each audio delimiter marker specifying a starting position of a corresponding audio piece;

a generating step of generating a file in which the text data and the positions of the text delimiter markers are associated with the audio data;

a storage step of storing the file generated by the file generator;

a receiving step of receiving a keyword; and a searching step of, when the acquired document data includes audio data, searching for the keyword through the text data associated with the audio data, wherein in case a speech included in the audio data continues from a time point of one of the audio delimiter markers for longer than a predetermined time length, the delimiting part divides the audio data with another audio delimiter marker at a time point that is the predetermined time length after the time point of the one of the audio delimiter markers, and wherein, when the acquiring step newly acquires other document data that is different from the acquired document data, and when the other document data includes the same audio data as the audio data included in the acquired document data, the searching step conducts a search with respect to the audio data included in said other document data of files previously stored in the storage.

17. A nontransitory computer readable medium encoded with an image processing program that causes a computer to perform the method of claim 16.

* * * * *